United States Patent

Pulliam

[15] 3,698,029
[45] Oct. 17, 1972

[54] AUTOMATIC WASHING APPARATUS

[72] Inventor: William D. Pulliam, 15710 Rosalita Drive, La Mirada, Calif. 90638

[22] Filed: Dec. 19, 1969

[21] Appl. No.: 886,678

[52] U.S. Cl. .................. 15/21 D, 15/56, 134/123, 134/180
[51] Int. Cl. .............................................. B60s 3/04
[58] Field of Search ...... 15/21 R, 21 D, 97 R, DIG. 2, 15/53, 56, 57, 77; 134/45, 123, 60, 48, 49, 172, 180

[56] References Cited

UNITED STATES PATENTS

| 3,481,346 | 12/1969 | McBurnett | 134/45 |
| 3,018,200 | 1/1962 | Huddle | 15/56 X |
| 3,289,238 | 12/1966 | Sorensen et al. | 134/123 X |
| 3,444,867 | 5/1969 | Thornton | 134/123 |
| 3,504,390 | 4/1970 | Wing | 15/56 |

FOREIGN PATENTS OR APPLICATIONS

| 708,400 | 7/1941 | Germany | 134/180 |
| 480,209 | 12/1969 | Switzerland | 15/DIG. 2 |

Primary Examiner—Walter A. Scheel
Assistant Examiner—Alan I. Cantor
Attorney—Rolf M. Pitts

[57] ABSTRACT

Apparatus for automatically washing nestable shopping carts and the like. Automatic conveyor means separately engaging an undercarriage of each of a plurality of shopping carts for nested conveyance of the carts successively through a wash chamber and a rinse chamber of said apparatus. A plurality of rotatably mounted brushes, disposed about the conveyor means, are adapted to frictionally engage the moving carts in a scrubbing action. A counter-balanced, vertically movable and inclined array of wash nozzles forms a vertically-movable adaptable array, provided for accommodating and washing the undercarriage of shopping carts of different design and manufacture.

3 Claims, 10 Drawing Figures

PATENTED OCT 17 1972 3,698,029
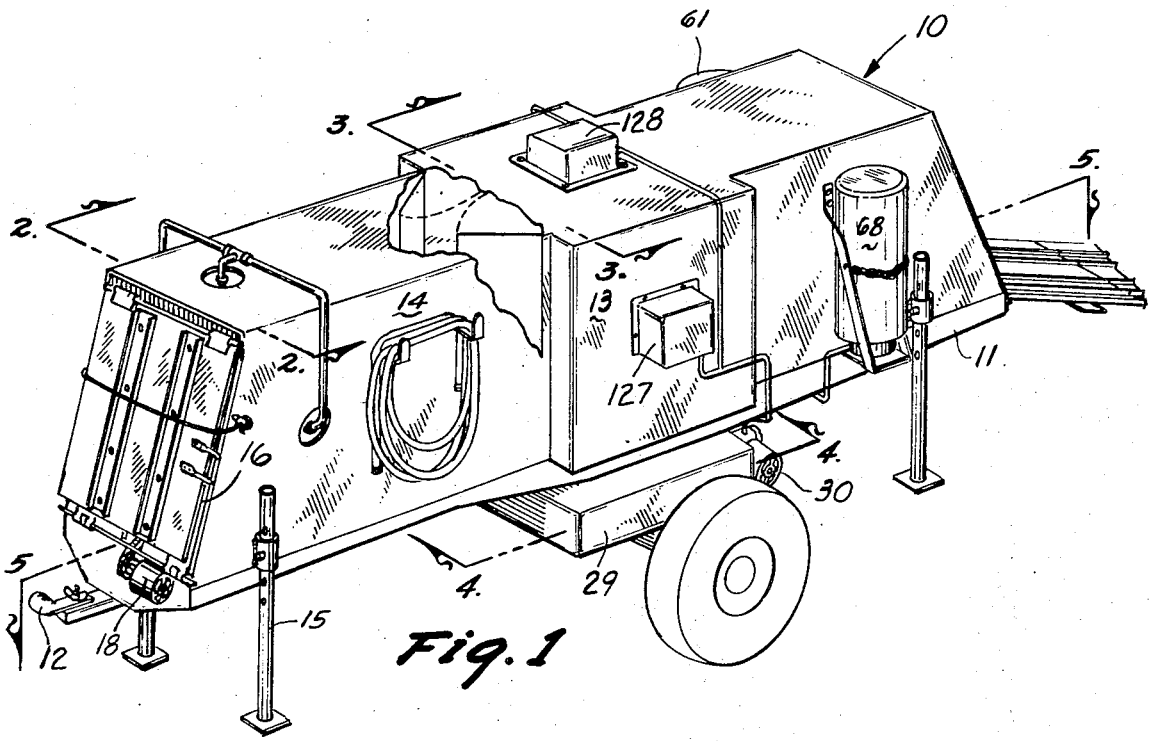
Fig.1
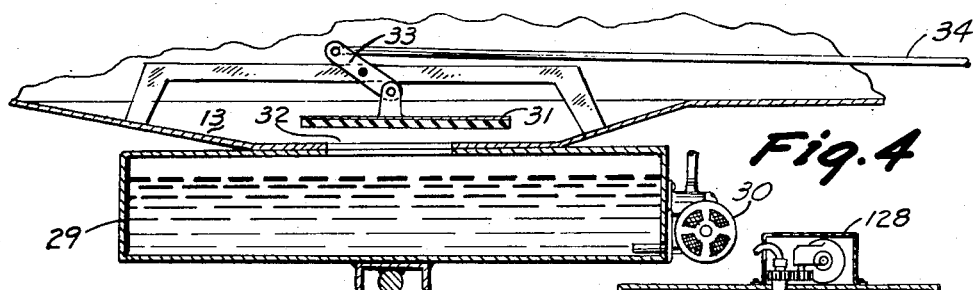
Fig.4
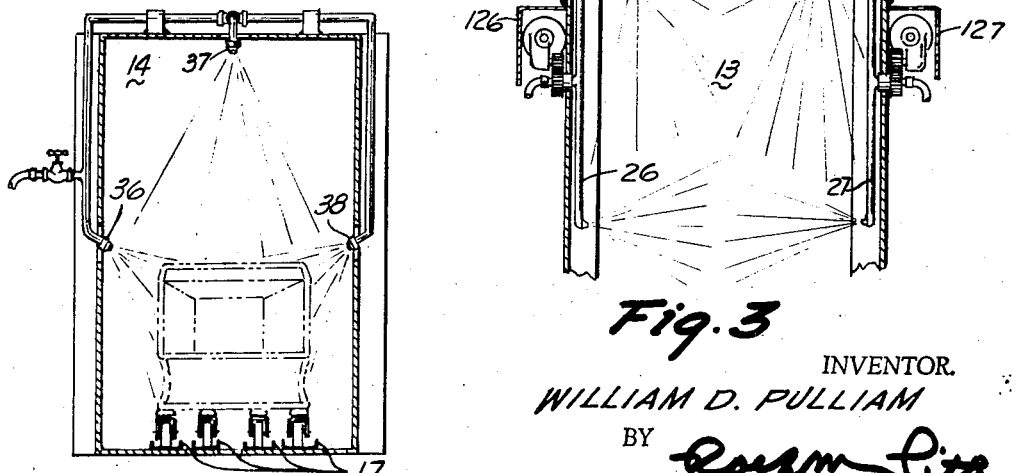
Fig.3
Fig.2
INVENTOR.
WILLIAM D. PULLIAM
BY

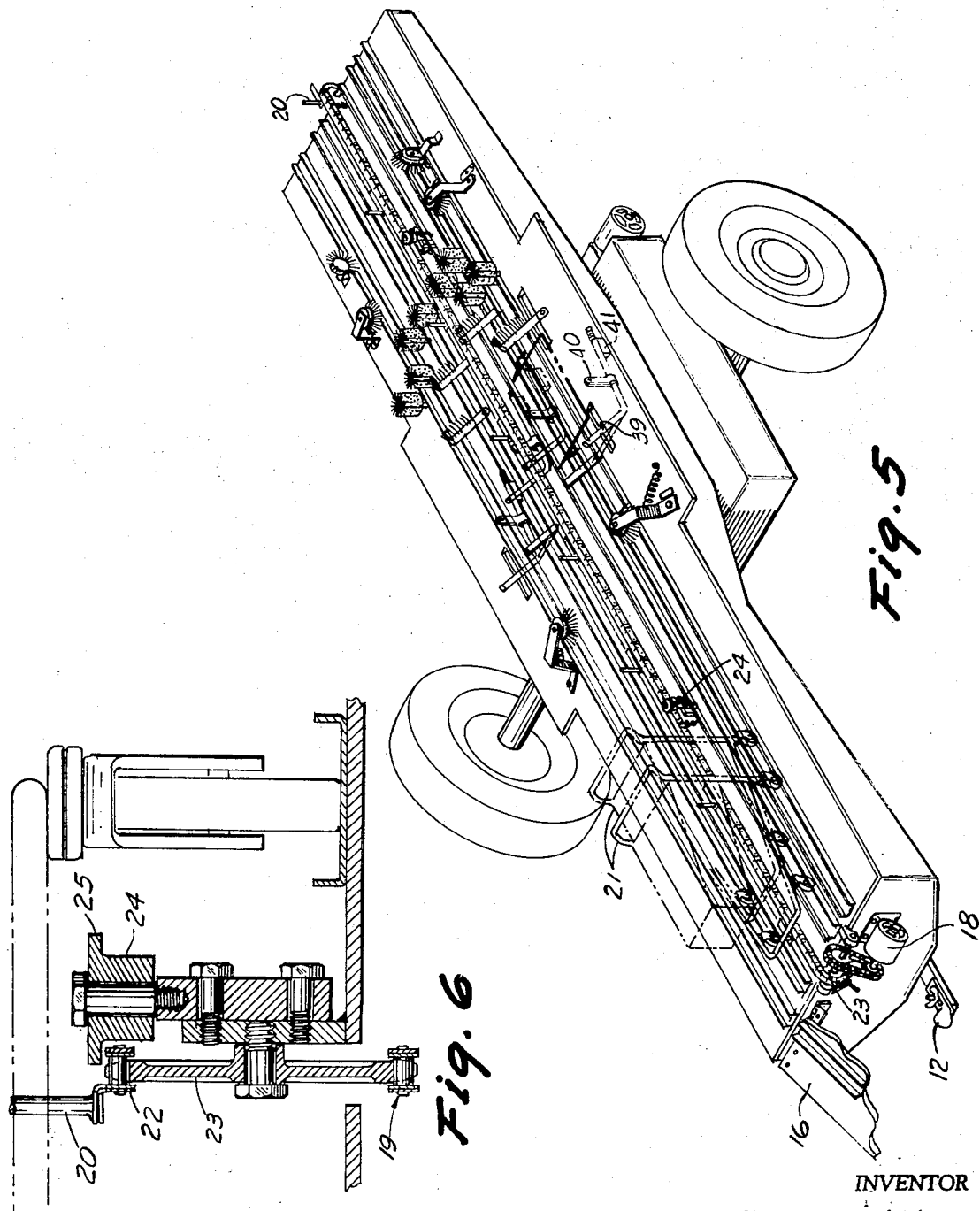

PATENTED OCT 17 1972 3,698,029

INVENTOR
WILLIAM D. PULLIAM

BY  *Roy M. Pitts*

ATTORNEY

AUTOMATIC WASHING APPARATUS

BACKGROUND OF THE INVENTION

In the operation of chains of large supermarkets and the like, nestable metal shopping carts are made available for the use of patrons and customers in the self-service shopping and selection of goods and foodstuffs and the transporting of purchases to parked conveyances outside the markets. Such carts are normally stored in a nested state so as to conserve floor space and to allow convenient movement and transport of large numbers of such carts (when empty) from one location to another, as in picking-up and retrieving such carts from a parking lot outside the market and returning them to the market. In the normal use of such carts by customers, the carts frequently become untidy in appearance and soiled due to the nature of the products transported, breakage and spillage of food products, the use of the undercarriage of the cart as a footrest or shoe-scraper, and due to general abuse. Such untidy and soiled state of such shopping carts tends to reduce trade in that shoppers of a particular nature prefer not to use such carts, either blocking store aisles searching for suitably clean carts or being content to limit purchases to what can be carried without the use of such carts, thereby reducing trade.

Efforts at cleaning such carts at individual markets have been limited to manual operations which are not entirely satisfactory due to the general inefficiency thereof. Too few carts are washed within a given interval and at too great a cost per cart, as to be only marginally acceptable in a high-volume, low-profit margin retail business. Thus, minimum maintenance costs and minimum levels of public acceptance are juggled to maintain an acceptable level of sales volume.

SUMMARY OF THE INVENTION

By means of the concept of the invention, a low-cost, highly effective apparatus is provided for efficiently and automatically washing a plurality of shopping carts of various designs and manufacture.

In a preferred embodiment of the invention then is provided apparatus for automatically washing nestable shopping carts and including automatic conveyor means separately engaging an undercarriage of each of a plurality of shopping carts for nested conveyance of the carts successively through a washing chamber and a rinsing chamber of the apparatus. A plurality of rotatably mounted brushes, disposed about the conveyor means, are adapted to frictionally engage the moving carts in a scrubbing action. A counterbalanced, vertically movable adaptable array of wash nozzles is provided for accommodating and washing the undercarriages of shopping carts of different design and manufacture. Thus, no motor drive machinery is required for driving the brushes and the equipment is self adapting to different size shopping carts. Also, the handling of the carts in a nested state assures washing the carts at a maximum rate.

In a further aspect of the invention, certain features imparting and enhancing portability of the apparatus are included, whereby the apparatus may be more fully and economically utilized by a number of different stores at different locations in a given area, whereby the efficiency of the arrangement may be more advantageously realized.

Accordingly, it is an object of the invention to provide portable apparatus for automatic washing of nestable shopping carts.

It is another object of the invention to provide means for automatically washing nestable shopping carts while in a substantially nested condition.

A further object is to provide efficient automatic washing means of economic and reliable design.

These and other objects of the invention will become apparent from the following description, taken together with the accompanying drawings, in which:

BRIEF DESCRIPTION OF THE DRAWINGS

FIG. 1 is a perspective view of the device of the invention, partially torn away;

FIGS. 2 and 3 are respective cross-sections of the rinse chamber portion of the device, taken along lines 2–2' and lines 3–3' respectively, of FIG. 1;

FIG. 4 is a longitudinal central section of the sump for the wash chamber of the device, taken along lines 4–4' of FIG. 1;

FIG. 5 is an exposed or phantom view of the platform area of FIG. 1, showing the general internal arrangement of the chain drive and brushes employed;

FIG. 6 is an exemplary cross-section of the chain drive of FIG. 5, showing more fully certain details thereof.

In the figures, like reference characters refer to like parts.

DESCRIPTION OF THE PREFERRED EMBODIMENTS

Figure 7:
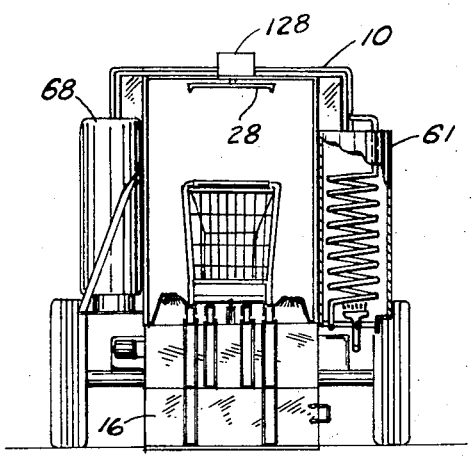
FIGS. 7, 8, 9 and 10 further illustrate additional details of the invention.
Figure 8:
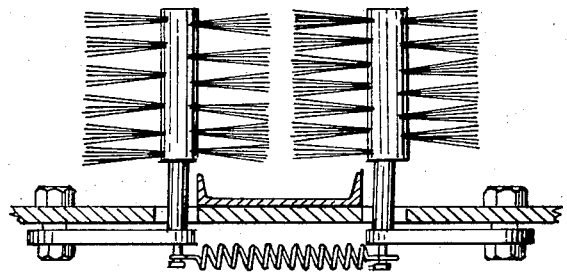

Referring now to FIG. 1, there is illustrated in perspective, the device of the invention. There is illustrated transportable or mobile apparatus for automatically washing nestable shopping carts and the like, and comprising a housing 10 mounted on a wheeled frame 11, the wheeled frame having a trailer hitch 12 mounted at a forward end thereof to facilitate towing of the apparatus, and the housing being divided into an aft wash chamber 13 (shown further in FIG. 3) and a forward rinse chamber 14 (shown further in FIG. 2) by means of spring-loadedly hinged partitions, as is understood in the art. There is also detachably mounted upon frame 11 and near each corner thereof an adjustable leg for stabilization of the apparatus in a stationary (non-transported) state thereof.

At either end of housing 10 is a door or closure means 16 comprising a doubly-hinged folding platform, one end of which is hinged to the end of frame 11, the closure 16 opening to form a ramp for ingress to and egress from the interior of housing 10, as shown in the rear view of FIG. 7. Each section of the folding ramp preferably includes U-shaped channels or tracks for confining and directing the travel of shopping carts, as to assure continued nesting thereof for ease in handling a plurality of such carts, and to guide the carts to the tracks associated with the washer conveyance system and shown as elements 17 in FIG. 2, the outer tracks accommodating the rear wheels of the shopping carts and the two inner tracks accommodating the forward wheels of the shopping carts.

There is further provided in FIG. 1 a first gear-head electric motor 18 for operation of automatic conveyor means, shown more particularly in FIG. 5. As illustrated in FIG. 5, such conveyor means comprises a sprocket-driven endless chain 19 having pick-up fingers 20 spaced approximately 1 foot therealong for separately engaging an underside of a respective one of a plurality of shopping carts 21 for substantially nested conveyance thereof forwardly through housing 10 (of FIG. 1) from aft wash chamber 13 through forward rinse chamber 14 along a preselected path within chamber 10 e.g., tracks 17 shown in FIG. 2). Chain 19 is operated at a speed of about 4 feet per minute (and thus, outputs about four carts per minute) for which purpose a one-tenth hp rating for gear-head motor 18 provides sufficient torque.

Figure 9:
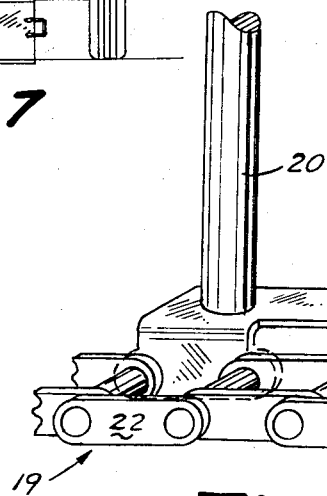

Pick-up fingers 20 are conveniently mounted on a given side of chain 19 upon one end of a link 22 thereof, as shown more clearly in the cross-section view of FIG. 6 and further shown in FIG. 9. Thus, as sprocket 23 drives chain 19, the off-center mounting of finger 20 along an upper length of chain loop 19 tends to topple or twist the chain, especially in a central section of such length, whereby an upright or vertical position would not be maintained for finger 20. For this reason, a roller 24 having a flange or lip 25 and rotatable about a vertical axis of rotation is mounted on frame 11 along the run of chain 19, and on that side thereof opposite that on which fingers 20 are located, lip 25 restraining any twisting tendency of chain 19.

Also included in the arrangement of FIG. 5 is a plurality of rotatably mounted brushes, disposed within the wash chamber about the preselected path over which the carts are forwardly conveyed. The mountings of such brushes are spring loaded or otherwise preloaded as to be adapted to frictionally engage the conveyed carts, whereby a rotational scrubbing action is imparted in response to forward conveyance of the carts past the rotatably-mounted brushes. Such brushes are arrayed to assure scrubbing contact with the several parts of the shopping cart undercarriage. The designs of such rotatable brushes are preferably open designs, with arrays of bristles at various angles. Although non-rotatably mounted brushes of a conventional solid bristle design could be employed, such an arrangement increases the drag imposed upon the conveyor chain drive and appears to provide decreased cleaning efficiency and increased brush wear.

The aft wash chamber 13 of FIGS. 1 and 3 includes wash nozzle arrays for spraying a solution of hot phosphoric acid or other appropriate cleaning fluid at the carts. Such wash nozzle arrays include a first, second and third radial arrays 26, 27 and 28, the first and second arrays 26 and 27 being adapted to be rotatably driven in a respective vertical plane parallel to and on opposite sides of the preselected path (represented by tracks 17) and separately oriented for directing fluid streams at a respective corresponding side of the carts-to-be-washed. The third radial wash nozzle array is adapted to be rotatably driven in a horizontal plane above the carts and oriented for directing fluid streams downwardly upon said carts. In an exemplary embodiment, the rotatable vertical arrays 26 and 27 may each be 37 inches in diameter and the rotatable horizontal array 28 may be 22 inches in diameter, as to compass the respective height and width of a shopping cart.

The rotatably driven wash nozzle arrays 26, 27 and 28 may be driven by one-seventieth hp gear-head motors 126, 127 and 128 at about 40 rpm.

The supply os washing solution is contained in a sump 29 of about 30 gallons capacity situated (in FIG. 1) immediately below the aft wash chamber 13 and into which the run-off from the wash nozzle arrays (in chamber 13) drains, as is further shown in FIG. 4. An integral motor-driven pump assembly 30 is located aft of and in fluid circuit with sump 29 and at a level relative thereto as to be self-priming. Pump 30, which may be of a one-half hp rating, receives washing solution from sump 29 and supplies pressurized washing solution to a heater assembly 61 located at a rearward position of housing 10. Such heater assembly may be of a conventional design, employing about 100–125 feet of metal tubing having an inside diameter of ⅜ inch to 1 inch, an inlet end of which is coupled in fluid circuit to a pressure output side of pump 30. Such coil is disposed about a gas burner, the fuel for which is supplied from a conventional pressurized tank 68 of commercially available gas fuel. Such coil discharges the hot pressurized wash fluid directly to wash nozzle arrays 26, 27, 28 and 39. Suitable safety features, not forming a part of the invention, may be included, such as gas shut-off valves and also a pressure pop-off valve for discharging hot pressurized wash fluid from the heating coil directly into sump 29.

FIG. 4 shows the manner in which sump 29 communicates with chamber 13 for receiving the run-off therefrom. In addition, there is illustrated in FIG. 4 sump closure means for selectively sealing off such communication during non-operative intervals for convenience in transportation, whereby sloshing and dynamic weight shifts and other free-surface liquid effects are reduced, if not avoided. Such means comprises a rigid cover 31 having an area preferrably greater than the mouth 32 of sump 29, rotatably coupled to a cam or crank 33, driven by a manually operated push-rod 34. The bottom face of cover 31 has a seat of resilient material, such as rubber, for assuring sealingly covering of mouth 32.

Electrical power driven elements 18, 126, 127, 128, 129 and 30 may be conveniently coupled to a conventional 110 volt arc power source by a single extension cord, not shown, and separate switching included, if desired for selective energization of such elements, as is well understood in the art.

Rinse chamber 14 (in housing 10 of FIG. 1) includes a fixed fog nozzle array for saturating the interior of such chamber with a fog or mist of clear rinse water. Such array, as shown in FIG. 2, may be comprised of three fog nozzles 36, 37 and 38, commonly adapted to be coupled to an ordinary pressurized source of rinse water, preferably softened. The broad shallow area of rinse chamber 14 serves as a temporary sump, to prevent slopping up of the work site, and may be emptied at any suitable drain by means of a drain cock, as is understood in the art.

In a preferred arrangement, all piping and plumbing interconnections are of stainless steel and filtered to prevent clogging of the nozzles, which employ apertures of 40–50 thousandths of an inch in diameter.

Figure 10:
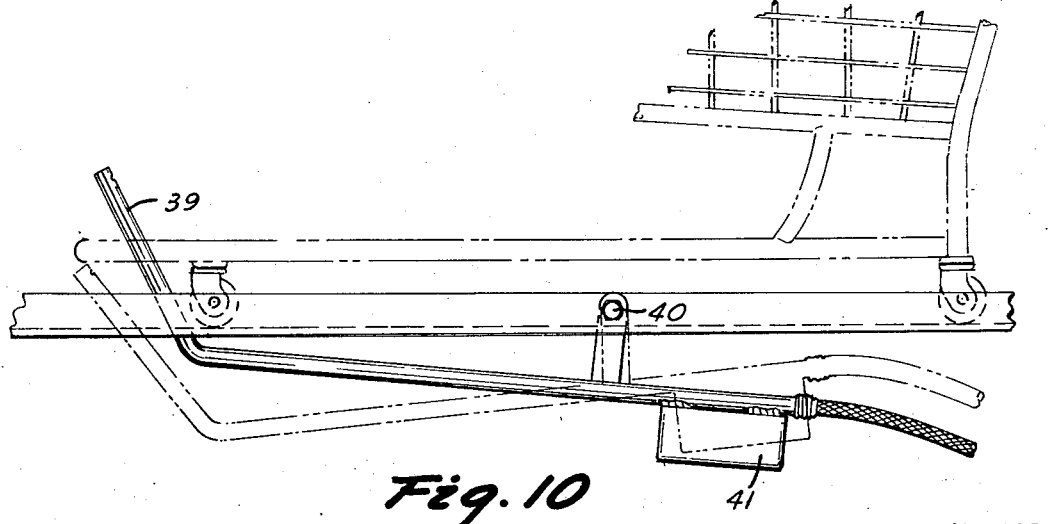

In view of the fact that several different undercarriage designs are employed by the various manufacturers of nestable shopping carts, the wash nozzle arrangement of chamber 13 includes a special array to accommodate such design variations, as shown more particularly in FIG. 5 an FIG. 10. There is further provided in the arrangement of FIG. 5, several adaptable inclined wash nozzle array assemblies having variously directed nozzles or apertures, each assembly being adaptably movably mounted for directing fluid streams (of washing solution) at an undercarriage portion of the shopping-carts-to-be-washed, the movable array being preloaded in such sense as to yieldingly oppose downward motion of the inclined array in response to a force exerted upon the array by an engaging undercarriage portion of a forwardly conveyed cart. For example, as illustrated, an array 39 is rotatably mounted upon a cantilever suspension point 40 and the rigid array then counter balanced by a weight 41 aft of suspension point 40. Forward motion against inclined array 39 rotates it counterclockwise (as shown in FIG. 5) and downward. As the forwardly moving shopping cart progresses to the rinse chamber, ceasing to restrain or press against array 39 (in the wash chamber), weight 41 counter rotates array 39 clockwise (as shown in FIG. 5) to its illustrated equilibrium position, as defined by suitable mechanical stops (not shown).

Hence, it is to be appreciated that transportable, self-contained means have been described for automatic washing of nested shopping carts at a convenient rate, and which require external provision of a pressurized source of rinse water and an electrical power outlet. Although the utility of the device has been described in terms of the washing of shopping carts, it is clear that other objects may be subjected to the device which is not so limited and that its usefulness may be applied to other objects.

Although the invention has been described and illustrated in detail, it is to be clearly understood that the same is by way of example only, and not by way of limitation, the spirit and scope of the invention being limited only by the terms of the appended claims.

I claim:

1. Apparatus for automatically washing nestable shopping carts and the like, comprising in combination
   a housing, said housing being divided into an aft wash chamber and forward rinse chamber by spring-loadedly hinged partitions;
   (automatic) conveyor means adapted for separately engaging an underside of each of a plurality of shopping carts for nested conveyance of said carts forwardly through said housing from said aft wash chamber through said rinse chamber along a pre-selected path within said housing; a plurality of rotatably mounted brushes disposed about said path within said aft wash chamber as to be adapted to frictionally engage said conveyed carts, whereby a rotational scrubbing action is imparted in response to said forward conveyance of said carts; a first, second and third radial wash nozzle array within said wash chamber, said first and second array adapted to be rotatably driven in a respective vertical plane parallel to and on opposite sides of said path and separately oriented for directing fluid streams at a respective corresponding side of said carts, said third radial wash nozzle array adapted to be rotatably driven in a horizontal plane above said path within said wash chamber and oriented for directing fluid streams downwardly upon said carts; at least one adaptable inclined wash nozzle array assembly of variously-directed nozzles adaptably vertically movably mounted within said path and within said wash chamber, for directing fluid streams at an undercarriage portion of said carts, said movable array mounting being preloaded in such a sense as to yieldingly oppose downward motion of said inclined array in response to a force exerted thereon by an engaging undercarriage portion of a forwardly conveyed cart, as to accommodate variations in undercarriage designs of said carts; rinse nozzle means located within said rinse chamber and adapted to be connected to an external source of pressurized rinse water;
   rinse water sump tank means forming a bottom of said rinse chamber for collection and selective disposal of waste rinse water;
   a wash fluid sump located below said wash chamber;
   wash fluid pump means having an inlet connected in fluid circuit to said sump and an outlet connected in fluid circuit to each of said wash nozzle arrays, said sump being arranged for drain collection of wash fluid emitted from said wash nozzle arrays; and;
   selectively operable closure means for drain collection closure of said sump, whereby adverse free-surface effects and sloshing may be reduced in a non-operative state of the apparatus.

2. Apparatus for automatically washing nestable shopping carts and the like, comprising in combination
   a housing, said housing being divided into an aft wash chamber and forward rinse chamber;
   conveyor means adapted for separately engaging an underside of each of a plurality of shopping carts for conveying said carts forwardly through said housing from said aft wash chamber through said rinse chamber along a pre-selected path within said chambers;
   a plurality of rotatably mounted brushes disposed about said path within said aft wash chamber as to be adapted to frictionally engage said conveyed carts, whereby a rotational scrubbing action is imparted in response to said forward conveyance of said carts;
   a first and second radial wash nozzle array, each adapted to be rotatably driven about a horizontal axis of rotation transversely of said path and situated on an opposing side of said path within said wash chamber and separately oriented for directing fluid streams at a respective corresponding side of said carts;
   a horizontal third radial wash nozzle array suited above said path within said wash chamber and adapted to be rotatably driven about a vertical axis and oriented for directing fluid streams downwardly upon said carts;
   at least one inclined wash nozzle array assembly of variously-directed nozzles vertically movably mounted within said path and within said wash chamber for directing fluid streams at an undercarriage portion of said carts, said movable array mounting being preloaded in such a sense as to yieldingly oppose downward motion of said inclined array in response to a force exerted thereon by an engaging undercarriage portion of a forwardly conveyed cart;

rinse nozzle means located within said rinse chamber and adapted to be connected to an external source of pressurized rinse water; and rinse water sump tank means forming a bottom of said rinse chamber for collection and selective disposal of waste rinse water;

a wash fluid sump located below said wash chamber;

wash fluid pump means having a self-priming inlet connected in fluid circuit to said sump and an outlet connected in fluid circuit to each of said wash nozzle arrays, said sump being arranged for drain collection of wash fluid emitted from said wash nozzle arrays; and selectively operable closure means for drain collection closure of said sump, whereby adverse free-surface effects and sloshing may be reduced in a transportable, non-operative state of the apparatus.

3. Apparatus for automatically washing nestable shopping carts and the like, comprising in combination a housing, said housing being divided into an aft wash chamber and forward rise chamber;

conveyor means adapted for separately engaging an underside of each of a plurality of shopping carts for conveying said carts forwardly through said housing from said aft wash chamber through said rinse chamber along a pre-selected path within said chambers;

a plurality of rotatably mounted brushes disposed about said path within said aft wash chamber as to be adapted to frictionally engage said conveyed carts, whereby a rotational scrubbing action is imparted in response to said forward conveyance of said carts;

a first and second radial wash nozzle array, each adapted to be rotatably driven about a horizontal axis of rotation transversely of said path and situated on an opposing side of said path within said wash chamber and separately oriented for directing fluid streams at a respective corresponding side of said carts;

a horizontal third radial wash nozzle array situated above said path within said wash chamber and adapted to be rotatably driven about a vertical axis and oriented for directing fluid streams downwardly upon said carts;

at least one inclined wash nozzle array assembly of variously-directed nozzles vertically movably mounted within said path and within said wash chamber for directing fluid streams at an undercarriage portion of said carts, said movable array mounting being preloaded in such a sense as to yieldingly oppose downward motion of said inclined array in response to a force exerted thereon by an engaging undercarriage portion of a forwardly conveyed cart;

rinse nozzle means located within said rinse chamber and adapted to be connected to an external source of pressurized rinse water; and rinse water sump tank means forming a bottom of said rinse chamber for collection and selective disposal of waste rinse water;

said apparatus being mounted upon a wheeled frame as to be transportable, and further comprising demountable legs for position and attitude stabilization of said frame in a non-transported state thereof;

closures at an aft entrance of said aft chamber and at a forward exit of said forward chamber, each of which closure comprises a foldable ramp;

a wash fluid sump located below said wash chamber;

fluid pump means having an inlet connected in fluid circuit to said sump and an outlet connected in fluid circuit to each of said wash nozzle arrays, said sump being arranged for drain collection of wash fluid emitted from said wash nozzle arrays;

selectively operable closure means for drain collection closure of said sump, whereby adverse free-surface effects and sloshing may be reduced in a transportable non-operative state of the apparatus; and heater coil means for maintaining a wash fluid utilized by said sump within a preselected temperature range.

* * * * *